United States Patent
Stumm et al.

(10) Patent No.: US 12,475,579 B1
(45) Date of Patent: Nov. 18, 2025

(54) ALIGNING DATA FOR MAPPING

(71) Applicant: Zoox, Inc., Foster City, CA (US)

(72) Inventors: Elena Stephanie Stumm, San Francisco, CA (US); Michael Carsten Bosse, Templeton, CA (US); Veeresh Taranalli, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 694 days.

(21) Appl. No.: 17/675,898

(22) Filed: Feb. 18, 2022

(51) Int. Cl.
*G06K 9/00* (2022.01)
*G06T 7/00* (2017.01)
*G06T 7/33* (2017.01)
*G06V 10/74* (2022.01)

(52) U.S. Cl.
CPC ............ *G06T 7/337* (2017.01); *G06T 7/0002* (2013.01); *G06V 10/761* (2022.01)

(58) Field of Classification Search
CPC . G06T 2207/10028; G06T 2207/30252; G06T 7/55; G06T 2207/20221; G06T 2207/30244; G06T 7/50; G06T 7/521; G06T 17/05; G06T 2207/20084; G06T 7/33; G06T 7/75; G06T 2207/10016; G06T 2207/20081; G06T 7/11; G06T 7/80; G06T 2207/20072; G06T 2207/30241; G06T 2207/30261; G06T 7/74; G06T 2207/30248; G06T 2207/10024; G06T 2210/56; G06T 7/73; G06T 17/20; G06T 7/13; G06T 7/246; G06T 2200/04; G06T 2207/10048; G06T 2207/20076; G06T 2207/20092; G06T 2207/30236; G06T 2207/30242; G06V 20/56; G06V 20/588; G06V 20/58; G06V 20/64; G06V 10/764; G06V 10/426; G06V 10/82; G06V 10/25; G06V 10/7715; G06V 10/806; G06V 20/584

See application file for complete search history.

(56) References Cited

U.S. PATENT DOCUMENTS

| | | | |
|---|---|---|---|
| 10,029,804 B1 * | 7/2018 | Chamberlain | G06T 7/136 |
| 10,703,841 B2 * | 7/2020 | Rabasco | C08G 18/751 |
| 2019/0251352 A1 * | 8/2019 | Hovden | G06V 20/176 |
| 2019/0278293 A1 * | 9/2019 | Levinson | G06T 17/20 |

* cited by examiner

*Primary Examiner* — Alex Kok S Liew
(74) *Attorney, Agent, or Firm* — Lee & Hayes, P.C.

(57) ABSTRACT

Techniques are described for modifying a factor associated with an invalid point cloud registration (e.g., alignment) between two data sets, to improve a map generation process. A computing system receives sensor data from a vehicle traversing an environment. The computing system aligns discrete data sets, such as to generate a representation of the environment based on the discrete data sets. In some examples, the computing system can apply an optimization algorithm to the alignments, to optimize the representation of the environment. The computing system identifies an invalid (non-ideal) alignment between two data sets and modifies a factor associated with the invalid alignment, introducing a repulsive force. The computing system performs an optimization with the modified factor, which causes a location associated with at least one of the two data sets to be different from a previously measured location. The computing system generates a map based on the optimization.

20 Claims, 5 Drawing Sheets

ALIGNING DATA FOR MAPPING

BACKGROUND

An autonomous vehicle can navigate in an environment at least partially based on a map of the environment. Such an autonomous vehicle may comprise sensors, such as lidar sensors, radar sensors, and other imaging sensors, which can be used to obtain data representative of the environment, with the data then used in a mapping process to generate a map or update an existing map. However, errors in the map or mapping process can create unsafe situations for those systems which rely on accurate maps, such as in the case with autonomous vehicles, as an example.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
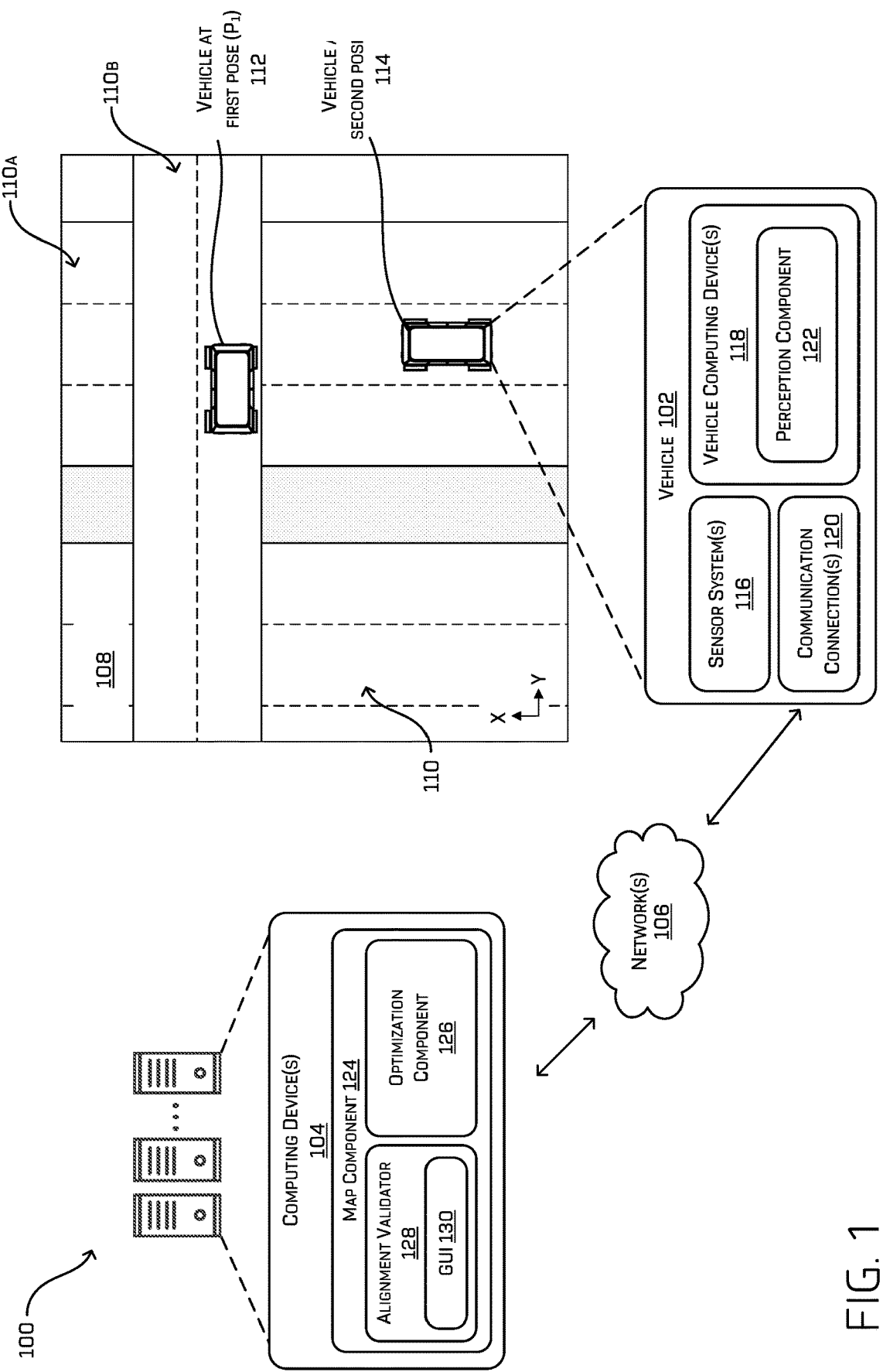
FIG. 1 is a schematic illustration of a system including one or more computing devices configured to generate a map of an environment utilizing sensor data captured by one or more sensors on a vehicle operating in the environment, in accordance with examples of the disclosure.

This application relates to improving accuracy of a generated map by, for example, modifying a factor associated with an invalid point cloud registration (e.g., point cloud alignment) in a map generating process. High Definition (HD) maps used by autonomous vehicles can be created by aligning, via point cloud registrations, sets of sparse sensor data corresponding to different poses (position and/or orientation) of one or more vehicles. In various examples, aligned sets of sparse sensor data can be used in a pose estimation algorithm, which can include an optimization algorithm to generate map data associated with an HD map. However, an error in alignment between two sets of data points (e.g., two sets of sparse sensor data), referred to herein as an invalid point cloud registration or invalid alignment, can be detrimental to the subsequent pose estimation algorithm, which can result in failure of the HD map building process, requiring manual intervention to complete HD map building process, which can be inefficient and time-consuming.

Techniques described herein identify an invalid point cloud registration and encode a "repulsive force" (e.g., a mathematical term which has the effect of minimizing the possibility that an optimization process determines the invalid registration as the optimal solution) between the two states associated with the invalid point cloud registration, to improve a map generation process. In at least one example, a computing system receives sensor data representative of an environment in which one or more vehicles operate. The sensor data can include data captured by one or more sensors on the one or more vehicles including, but not limited to lidar sensors, radar sensors cameras, motion detectors, and the like. In at least one example, the sensor data can include lidar data representative of the environment at different poses of the vehicle.

In at least one example, the computing system can be configured to receive the sensor data and generate a factor graph representation thereof. The factor graph representation can include poses associated with the vehicle (e.g., nodes) and associations between the poses (e.g., edges). In at least one example, the associations can include estimates or measurements of a relative transformation (transform) between two poses (e.g., states) of the vehicle. For example, the computing system can project at least two sets of sparse data, each associated with a different pose of the vehicle, into a voxel space, and to identify a transform or alignment of the two sets of sparse data. The alignment can include a six degree of freedom (6 DoF) transform of a first data set with respect to a second data set of the sets of sparse data. In at least one example, the computing system can run a pose estimation algorithm on the aligned data sets, which can include an optimization algorithm, to generate map data. However, errors in the alignment, such as improperly associated or aligned data sets, can result in the generation of erroneous map data.

In various examples, the computing system can be configured to identify an invalid point cloud registration, or invalid alignment of the sets of sparse data (e.g., invalid transform). That is, the computing system can identify an error associated with the transform between the first data set and the second data set. In at least one example, the computing system can identify the error based on human input. For example, a user can submit, via a user interface, an input representative of an identified error in an alignment between two sets of sparse data. Based on the input, the computing system can identify the invalid point cloud registration.

In various examples, the computing system can be configured to automatically (e.g., without human input) identify the invalid point cloud registration the utilizing the techniques such as those described in U.S. patent application Ser. No. 17/549,516, filed Dec. 13, 2021, and entitled "LIDAR POINT CLOUD ALIGNMENT VALIDATOR IN HD MAPPING," the entire contents of which is incorporated herein by reference for all purposes. In at least one example, the computing system can identify the invalid point cloud registration based on characteristic(s) of voxels in the voxel space that include at least a portion of the first data set and/or the second data set.

In some examples, the characteristic(s) can include semantic classification labels associated with data points of the first data set and the second data set. In such examples, based on a determination that the semantic classification labels (e.g., drivable surface, walkable surface, infrastructure (e.g., buildings, poles, etc.), vegetation, cars, people, bicycles, etc.) associated with data points of the first data set and the second data set in a particular voxel differ by a threshold amount, the computing system can identify the invalid point cloud registration. That is, a check on semantic classification labels associated with data points that are at least partially aligned may be utilized to determine whether a given point cloud registration is invalid. For example, in response to projecting the first data set and the second data set into the voxel space, the computing system can compare semantic classification labels associated with data points of the first data set and the second data set that reside in a single (or same) voxel in the voxel space. In response to a determination that of the threshold difference between the semantic classification labels associated with first data set and the second data set that reside in the single voxel meets or exceeds a threshold difference, the computing system determines that the point cloud registration between the first data set and the second data set is invalid.

In some examples, the characteristic(s) can include occupied space and/or free space associated with voxels in the voxel space into which the first data set and the second data set are projected. In some examples, the computing system can compare voxels that are at least partially aligned to determine whether a same or similar number of data points associated with the first data set and the second data set reside within a voxel of the voxel space. In some examples, the computing system can compare voxels to determine whether a voxel is occupied by one or more data points of the first data set, but not the second data set. That is, the computing system can determine invalidity based on a determination that a first voxel is occupied by data points of the first data set, but constitutes free space with regard to the second data set (e.g., inconsistency between occupied space and free space within one or more voxels). In some examples, the free space can be determined based on a threshold number of data points of a data set being associated with a voxel. In some examples, the free space can be determined utilizing ray casting techniques. In response to a determination that a same voxel in the voxel space is occupied by a first data set (e.g., threshold number of data points associated with the voxel) but not the second data set, the computing system determines that the point cloud registration between the first data set and the second data set is invalid.

In various examples, in response to a determination of invalidity with respect to the point cloud registration, the computing system can encode the point cloud registration with a repulsive factor (e.g., repulsive force) and perform a second optimization with the repulsive factor. In at least one example, the repulsive factor can cause a location associated with at least one of the first data set or the second data set with respect to the factor graph to be associated with a different location. That is, the repulsive factor can cause a first pose location associated with the first data set to be modified to a second pose graph location in the second optimization.

In some examples, the repulsive factor can include a modification to a binary factor associated with the invalid point cloud registration. In some examples, the modification to the binary factor can cause a distance between a first pose associated with the first data set and a second pose associated with a second data set to be modified in the second optimization. In some examples, the repulsive factor can include a modification to a cost function associated with the invalid point cloud registration. In such examples, the cost function can be modified to generate large errors in the second optimization in response to the first pose and the second pose being a measured distance from one another. In at least one example, the repulsive force can cause one or more data points associated with at least one of the first data set or the second data set to be associated with different location(s) in the second optimization other than the measured locations associated with the invalid point cloud registration in response to the first optimization.

In at least one example, the computing system can be configured to generate map data based on the second optimization. In some examples, the computing system can iteratively perform optimizations until identifying that a number of invalid point cloud registrations associated with an optimization is less than a threshold number (e.g., less than 1, less than 2, etc.). In some examples, the computing system can be configured to validate map data based on the number of invalid point cloud registrations being less than the threshold. In some examples, the computing system may request human intervention, such as via a user interface, to validate the map data.

In some examples, in response to map data validation, the computing system can transmit the map data as an updated map to one or more vehicles in an environment. In at least one example, the vehicle(s) can utilize the updated map for navigation and/or localization of the vehicle in the environment.

Techniques described herein can reduce a need for manual intervention in an HD map generating process. As discussed above, conventional systems can require human intervention to identify invalid point cloud registration and either delete or remove the invalid point cloud registration from consideration in the map generating process. For example, the person intervening would have to identify each invalid point cloud registration and individually mark each invalid point cloud registration to be ignored or deleted. This can be an extremely time and computing resource intensive process. Unlike these conventional systems, the techniques described herein provide a means for automatic detection of and resolution with respect to invalid point cloud registrations. As such, the techniques described herein can render available additional computing resources, such as those previously used to identify and manually resolve (e.g., delete, mark to ignore) invalid point cloud registrations, for other functions.

Additionally, techniques provided herein can improve the safe operation of vehicles. As described above, conventional techniques require manual intervention to either delete or remove all invalid point cloud registrations in the map generating process. Failure to delete or ignore every invalid point cloud registration can introduce errors into the final map result. In some examples, the errors can be small and thus hard to detect. However, any errors in the final map result can potentially impact safe operation of the vehicle. Unlike the conventional techniques, the techniques described herein can automatically detect and modify the invalid point cloud registrations, and re-optimize, to ensure accuracy of the map data and corresponding final map result. As such, the techniques described herein can improve the overall safe operation of the vehicles.

Further, conventional systems perform optimization utilizing nonlinear optimization algorithms. These nonlinear optimization algorithms can be subject to "getting stuck" in a local minima, thereby preventing an accurate optimization result. However, by modifying a binary factor and/or modifying a cost function associated with a detected invalid point cloud registration, as described herein, the techniques described herein can prevent the optimization algorithm from getting stuck in the local minima. As such, the techniques described herein can improve an accuracy of an optimization. Moreover, by improving the accuracy of the optimization, the techniques described herein may improve the functioning of an associated computing device, such as by preventing the need for a re-initiation of the optimization process, such as that required in conventional systems to escape the local minima.

The techniques described herein may be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In another example, the techniques can be utilized in an aviation or nautical context, or in any system using machine vision (e.g., in a system using image data).

A system 100 is illustrated schematically in FIG. 1, and includes a vehicle 102 and one or more computing devices 104 connected to the vehicle over a network 106. The vehicle 102 can be configured to travel in an environment 108, which can comprise static objects such as road surfaces 110, sidewalks, vegetation and buildings, as well as dynamic objects such as pedestrians and other vehicles. In the illustrative example, the road surfaces include a first road surface 110a, representative of a first road on which the vehicle 102 is traveling, and a second road surface 110b, representative of a second road located above and substantially perpendicular to the first road surface 110a (e.g., an overpass). As the vehicle 102 travels through the environment 108, the vehicle 102 can adopt different positions and/or orientations, i.e. poses, with a first pose 112 illustrated as P1, and a second pose 114 illustrated as P2.

For the purpose of illustration, the vehicle 102 can be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. This is merely an example, and the systems and methods described herein may be incorporated into any vehicle and/or robot, including those ranging from vehicles that need to be manually controlled by a driver at all times, to those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

The vehicle 102 can comprise one or more sensors systems 116, one or more vehicle computing devices 118, and one or more communication connection(s) 120. Non limiting examples, of the sensor system(s) 116 include cameras, lidar sensors, radar sensors, motion sensors, and/or the like. In at least one example, the sensor system(s) 116 can capture sensor data of the environment 108 in which the vehicle 102 travels.

A perception component 122 of the vehicle computing device(s) 118 can receive the sensor data and perform semantic segmentation, such as to classify one or more objects in the environment 108 (e.g., static objects, dynamic objects, etc.). In various examples, the perception component 122 can be configured to associate a semantic classification label with the sensor data, such as per detected object and/or a per pixel (e.g., camera data) or per-point (e.g., lidar data) basis.

Figure 2:
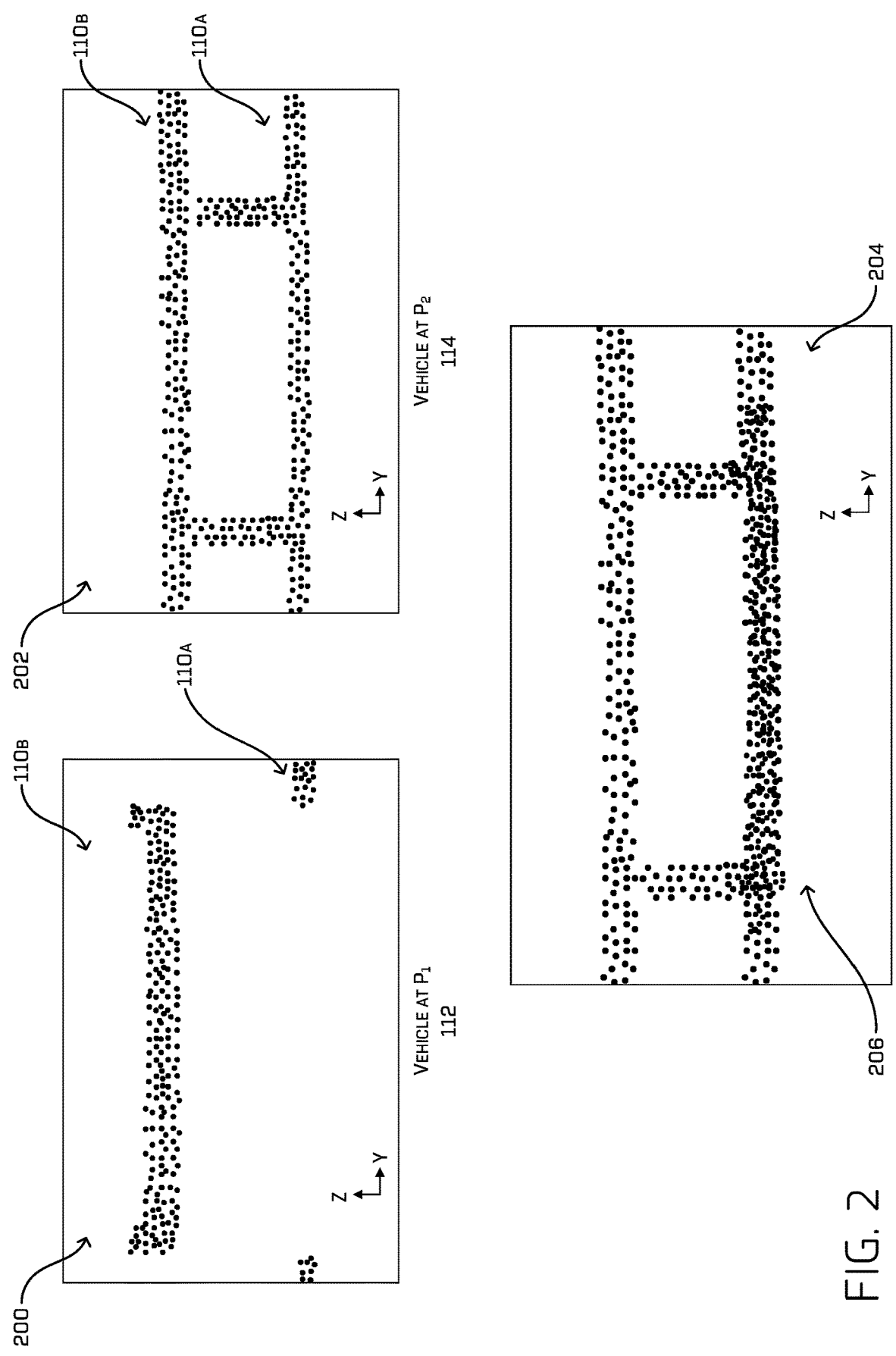
FIG. 2 illustrates example representations of an environment at different times and an example representation of an invalid point cloud representation between sparse sets of data associated with the different times, in accordance with examples of the disclosure.

In at least one example, the lidar data can include sets of data points, also referred to herein as point clouds, with each set of data points corresponding to a particular pose of the vehicle 102 within the environment 108 (e.g., data points in the environment will be relative to the local position and/or orientation of the vehicle 102 when captured). Although the first pose 112 ($P_1$) and the second pose 114 ($P_2$) are illustrated in FIG. 1 for a single vehicle 102, it will be appreciated that in other examples the lidar data can correspond to poses of different vehicles in the same environment 108, e.g. in the same geographic location. Furthermore, the lidar data associated with the first pose 112 and the second pose 114 can be associated with a same or different trajectories. That is, the lidar data associated with the first pose 112 and the second pose 114 need not necessarily be obtained at corresponding time intervals, e.g. data associated with the second pose 114 not necessarily obtained immediately following the data associated with the first pose 112. An illustrative first data set 200 and second data set 202, i.e. first and second point clouds, sets of data points, are shown in FIG. 2, with the first data set 200 corresponding to the first pose 112, and the second data set 202 corresponding to the second pose 114.

In various examples, the perception component 122 can be configured to perform operations to associate individual data points within the lidar data with respective semantic classification labels. That is, the perception component 122 can associate a semantic classification label with each data point of a lidar point cloud. In some examples, the perception component 122 can utilize image data to identify the respective semantic classification labels associated with individual data points within a lidar data set.

In some examples, the perception component 122 can be configured to identify dynamic objects in the environment (e.g., pedestrians, vehicles, bicyclists, etc.). The dynamic objects can be identified based on semantic classification labels, detected movement overtime, and/or the like. In some examples, the perception component 122 can filter lidar data associated with the dynamic objects such that a filtered lidar data set comprises static objects. In such an example, the perception component 122 can identify static (e.g., unmoving) objects in the environment 108, such as to validate or update a map associated with the environment 108. In at least one example, the perception component 122 can send the filtered lidar data and/or other sensor data (collectively referred to as "sensor data") to the computing device(s) 104 over the network 106 via the communication connection(s) 120.

In some examples, sensor data obtained by the vehicle can be utilized by the computing device(s) 104 to determine a high definition (HD) map of the environment 108. In some examples, the computing device(s) 104 can be configured to update and/or validate an existing map of the environment 108 based on the sensor data. In various examples, the computing device(s) 104 determine the map data (e.g., updates, validations, etc.) utilizing a map building process. In at least one example, the map building process includes a pose graph optimization associated with lidar data, odometry data, and/or other sensor data captured by the vehicle 102 while operating in the environment 108.

In at least one example, a map component 124 of the computing device(s) 104 can include an optimization component 126 configured to determine an alignment between multiple sets of sparse sets of sensor data. In some examples, the optimization component 126 can determine that a first data set and a second data set are related such that the first data set and the second data set include overlapping features in the environment 108. Based on the determination of a relation between the first data set and the second data set, the optimization component 126 can determine a relative alignment between the first data set and a second data set. In at least one example, the relative alignment can include an estimate or measurement of a relative six degree of freedom (6 DoF) transformation (transform) between a first pose associated with the first data set and a second pose associated with the second data set.

In at least one example, the optimization component 126 can project the first data set and the second data set into a voxel space to determine the transform, utilizing techniques such as those described in U.S. Pat. No. 10,983,199, issued Feb. 14, 2019, and entitled "Vehicle Sensor Calibration and Localization," the entire contents of which is incorporated herein by reference and for all purposes. In various examples, the optimization component 126 can run a pose estimation algorithm on the transformed (aligned) first data set and second data set. In at least one example, the pose estimation algorithm includes an optimization algorithm.

In various examples, an alignment validator 128 of the map component 124 can be configured to identify an error in the alignment between the first data set and the second data set. That is, the alignment validator 128 can be configured to identify an invalid point cloud registration. In some examples, the alignment validator 128 can include a graphical user interface 130 (GUI 130) via which a human operator can interact with the sensor data. In at least one example, the GUI 130 can include an interface via which the human operator can input an indication of invalidity with respect to a transformation. That is, the human operator, viewing the optimized data sets (output of the optimization algorithm) can input an indication that a transform between two data sets (e.g., the first data set and the second data set) is invalid or incorrect.

In some examples, the human operator may view the voxel space including the projected data sets via the GUI 130. In some examples, the human operator can identify, based on locations of data points associated with a first data set, that an alignment between the first data set and the second data set is incorrect. In some examples, the human operator can select one or more data points associated with the first data set and associated a flag (of invalidity) therewith. That is, the human operator can manually flag one or more data points as being improperly aligned and/or located in an erroneous location. In some examples, in response to identifying that the flag is associated with the first data set, the alignment validator can identify an invalid point cloud registration associated with the selected data points. That is, the alignment validator 128 can identify the particular alignment or transform that resulted in the selected data points associated with the erroneous location(s), and can flag the particular alignment or transform as an invalid point cloud registration.

In some examples, the human operator can view, via the GUI 130, a pose graph associated with the alignment between at least the first data set and the second data set. In some examples, the pose graph can include a position of a first node associated with the first data set and a second node associated with the second data set, with a corresponding transform (e.g., edge) connecting the first node and the second node. In various example, the human operator can select the transform between the first node and the second node to view the first data set and the second data set relative to one another. That is, the first data set and the second data set are represented based on the transform. In various examples, the human operator can recognize, based on the visual depiction of the first data set presented relative to the second data set, whether the alignment between the two is correct. In at least one example, the GUI 130 can include a selectable control for the human operator to validate or invalidate the alignment. Based on receiving an indication of selection of a selectable control associated with an invalid alignment (e.g., human operator designates the alignment as invalid), the alignment validator 128 can associated the invalid point cloud registration with the selected transform.

In various examples, the alignment validator 128 can be configured to automatically determine an invalid point cloud registration. In such examples, the alignment validator 128 can determine the invalid point cloud registration without human intervention. In at least one example, the alignment validator 128 can identify the invalid point cloud registration utilizing techniques such as those described in U.S. patent application Ser. No. 17/549,516, the entire contents of which is incorporated herein by reference above. In some examples, the alignment validator 128 can determine the invalid point cloud registration based on results of the first optimization, described above. In some examples, the alignment validator 128 can determine the invalid point cloud registration independent of the first optimization.

In at least one example, the alignment validator 128 can identify the invalid point cloud registration based on one or more characteristics of voxels in the voxel space that include at least a portion of the first data set and/or the second data set. In such an example, the alignment validator 128 can be configured to determine characteristic(s) associated with each voxel in a voxel space into which the first data set and the second data set are projected. The characteristic(s) can include semantic classification labels associated with data points located in a voxel, free space in the voxel, occupied space in the voxel, and/or the like.

As discussed above, the perception component 122 can provide, to the map component 124 and subsequently to the alignment validator 128, semantic classification labels associated with each data point of a data set. In various examples, the alignment validator 128 can compare first semantic classification labels associated with a portion of the first data set located in a particular voxel to second semantic classification labels associated with a portion of the second data set located in the particular voxel. In some examples, based on a comparison between the first semantic classification labels and the second classification labels, the alignment validator 128 can determine a similarity score associated with the particular voxel. In some examples, in response to determining that a similarity score is less than a threshold similarity for the particular voxel and/or for a threshold number of voxels in the voxel space, the alignment validator 128 can identify the invalid point cloud registration between the first data set and the second data set.

In various examples, the alignment validator 128 can identify the invalid point cloud registration between the first data set and the second data set based on identified occupied and/or free space in a particular voxel with respect to the first data set and the second data set. That is, if a portion of the first data set occupies the particular voxel (e.g., occupied space in the voxel with respect to the first data set), but no portion of the second data set occupies the particular voxel (e.g., free space in the voxel with respect to the second data set, an inconsistency between occupied space and free space with respect to the first data set and the second data set), the alignment validator 128 can identify an invalid point cloud registration. In at least one example, the alignment validator 128 can be configured to determine a similarity metric associated with occupancy of the first data set and the second data set associated with a particular voxel in the voxel grid. That is, the alignment validator 128 can determine similarity in occupancy or free space of a portion of the first data set and a portion of the second data set in a particular voxel.

In at least one example, the alignment validator 128 can be configured to compare the similarity metric to a similarity threshold to determine whether the point cloud registration is valid. In some examples, based on a determination that the similarity metric meets or exceeds the threshold, the alignment validator 128 can identify the point cloud registration as invalid (e.g., non-ideal, incorrect, an outlier, etc.). In other examples, based on a determination that the similarity metric is equal to or less than the threshold, the alignment validator 128 can identify the point cloud registration as invalid. In at least one example, the determination of invalidity based on a comparison to the threshold can be based at least in part on a method for determining the similarity metric. For example, utilizing the techniques described in U.S. patent application Ser. No. 17/549,516, an error in alignment is identified based on a higher value for the similarity metric (e.g., higher value corresponds to less similarity). As such, the alignment validator 128 can identify the point cloud registration as invalid based on a determination that the similarity metric meets or exceeds a threshold. For another example, the similarity metric can be calculated to include a low value corresponding to a greater degree of similarity, such as by assigning a low value (e.g., 0, 1) to voxels with substantially similar occupancy and a high value (e.g., 2, 4) to voxels with little to no matching occupancy.

In some examples, the alignment validator 128 can be configured to identify occupancy and/or free space in a voxel utilizing ray casting techniques, such as those described in U.S. patent application Ser. No. 17/549,516. As such, in at least one example, the alignment validator 128 can be configured to utilize a ray casting algorithm to identify the occupancy and/or free space, such as to determine whether a point cloud registration is invalid. Based on a determination that the occupancy and/or free space associated with a particular voxel differs by at least a threshold value, the alignment validator 128 can determine that the point cloud registration between the first data set and the second data set is invalid.

In various examples, in response to determining that a point cloud registration is invalid (e.g., based on manual input via the GUI 130 or automatically based on characteristic(s) of the voxel space), the alignment validator 128 can provide an indication thereof to the optimization component 126. In response to receiving the indication of invalidity associated with a particular point cloud registration (e.g., alignment between two data sets), the optimization component 126 can modify a factor associated with the point cloud registration. As a non-limiting example, the optimization component 126 may associate a weight and/or flag with a node (or nodes) such that when input to a subsequent optimization the nodes are "repulsed" or biased away from their current position, as described in detail herein. In response to modifying the factor, the optimization component 126 can re-perform an optimization (e.g., run an optimization algorithm with the modified factor associated with the previously determined invalid point cloud registration).

In at least one example, the modified factor can cause at least one of the first data set or the second data set in a second optimization to be associated with a different location than a measured location. In some examples, the modified factor can include a repulsive force, repelling or biasing the at least one of the first data set or the second data set away from the measured location in the results of the second optimization. That is, the modified factor can cause the at least one of the first data set or the second data set to be associated with any location other than the measured location.

In some examples, the modified factor can cause a distance and/or an angular difference between the first data set and the second data set to change in the second optimization, from a first distance and/or angular difference associated with the invalid point cloud registration (e.g., first distance (lateral, longitudinal, vertical) and/or first angular difference (pitch, roll, yaw) between the first data set and the second data set) to a second distance and/or a second angular difference associated with an updated point cloud registration between the first data set and the second data set (e.g., second distance and/or second angular difference between the first data set and the second data set after the second optimization). In at least one example, the distance and/or angular difference can be associated with a pose graph location. That is, the first distance and/or first angular difference can include a distance and/or angular difference between a first pose associated with the first data set and a second pose associated with the second data set in a first pose graph generated after a first optimization and the second distance and/or a second angular difference can include an updated distance and/or angular difference between respective poses of the first data set and the second data set after a second optimization.

In at least one example, the modified factor can include a modified cost function associated with the invalid point cloud registration. The modified cost function can modify an error associated with the invalid point cloud registration in the second optimization, such as to cause a modification to a location associated with the first pose (e.g., first data set) and/or the second pose (e.g., second data set). In at least one example, the modified cost function can cause a high penalty (e.g., large error) to be assessed in the second optimization for associating a measured distance between the first pose and the second pose (e.g., the distance determined in the first optimization). As an illustrative example, assuming d is the distance between a node and a measured (or incorrect position), the error is represented as $e=1/d^p$, where p modulates how sharp or blunt the repulsion is. As other examples, the error can be represented as $e=\exp(-d^p)$, $e=1/(1+d^p)$, $e=1/(1+d^p)^{(1/p)}$, and/or the like. That is, the modified cost function can cause the distance between the first pose and the second pose to be a distance other than that which was measured. In at least one example, the repulsive force can cause one or more data points associated with at least one of the first data set or the second data set to be associated with different location(s) in the second optimization other than the measured locations associated with the invalid point cloud registration in response to the first optimization.

In some examples, the modified factor can include a modified loss function associated with the invalid point cloud registration. The modified loss function can modify a weight associated with the invalid point cloud registration in a subsequent optimization. That is, the modified loss function can modify an influence the outlier or invalid point cloud registration in an optimization.

Though described as identifying an invalid point cloud registration between two discrete (sparse) sets of data (e.g., first data set and the second data set), this is not intended to be so limiting, and the techniques described herein can be used to identify and modify factors associated with one or more invalid point cloud registrations that result from an optimization of a plurality of data sets associated with sensor data. In various examples, in response to the second optimization, the optimization component 126 can identify whether any of the plurality of data sets have associated therewith an invalid point cloud registration. That is, the optimization component 126 can identify any remaining invalid point cloud registrations after a second optimization.

In various examples, in response to identifying that an invalid point cloud registration is associated with an optimization (e.g., the second optimization), the optimization component 126 can modify the factor associated with the invalid point cloud registration to associate a repulsive force therewith, and can perform another optimization (e.g., a third optimization). In various examples, the optimization component 126 can be configured to iteratively perform the optimizations until determining that a number of invalid point cloud registrations associated with an optimization is less than a threshold number (e.g., less than 1, less than 2, etc.).

In some examples, in response to determining that the number of invalid point cloud registrations is less than the threshold, the optimization component 126 can validate the map data associated with the optimization. In such examples, the optimization component 126 can verify the map data automatically, such as without human intervention. In some examples, the optimization component 126 can be configured to determine a preliminary validation of the map data, and request a confirmation, such as by the human operator, of the map data. In some examples, the optimization component 126 can cause a request to validate the map data to be presented to the human operator via the GUI 130. In such examples, the GUI 130 can provide a means by which the human operator can view and/or validate the map data.

In various examples, in response to receiving an indication of validity of the map data associated with the optimization, the map component 124 can transmit the map data to the vehicle 102 as a map of the environment 108. In some examples, the map component 124 can send the map data to a plurality of vehicles, such as a fleet of vehicles 102 operating in and around the environment 108. In at least one example, each vehicle 102 in the fleet can utilize the map data (e.g., updated map) for navigation and/or localization of the vehicle 102 in the environment 108.

FIG. 2 illustrates example data sets associated with the environment 108 captured at different poses (e.g., $P_1$, $P_2$) and an example representation of an invalid point cloud representation between the data sets. For example, a first data set 200 can correspond to a first pose 112 of the vehicle (e.g., vehicle 102) and a second data set 202 can correspond to a second pose 114 of the vehicle.

Based at least in part on a determination that the first pose 112 and the second pose 114 of the vehicle are associated with similar areas in the environment 108, a computing system receiving the first data set 200 and the second data set 202 determines to align the data sets 200 and 202. That is, based on a determination that there is sufficient co-visibility and/or geographic locations between the first pose 112 and the second pose 114 (e.g., the vehicle sees similar static objects, is located in a similar place in the environment, etc.), the computing system can attempt to align the first data set 200 and the second data set 202.

In the illustrative example, the alignment 204 represents an invalid alignment. For example, the computing system does not recognize a distance between the first road surface 110a and the second road surface 110b. As a result, in an alignment between the first pose 112 and the second pose 114, the computing system can associate a portion of the first data set 200 that is representative of the second road surface 110b with a portion of the second data set 202 that is associated with the first road surface 110a, resulting in a collapse 206 of the overpass corresponding to the second road surface 110b. In some examples, the collapse 206 can represent an invalid alignment between the first data set 200 and the second data set 202.

In some examples, the collapse 206 can represent an invalid alignment or transform between a first node of a pose graph and a second node of the pose graph, the first node and the second node being associated with the first pose 112 and the second pose 114. In at least one example, a human operator viewing the pose graph can select a transform between the first node and the second node, and can view the alignment 204. Based on a determination that the collapse 206 is an inaccurate reflection of the environment, the human operator can select a control indicating that the transform is invalid. That is, the collapse 206 can represent an invalid location of at least one of a data point associated with the first data set 200 and the second data set 202 and/or an incorrect distance and/or angular difference between the first node and the second node in the pose graph.

In various examples, based at last on part on the collapse 206 or incorrect association with the portion of the second road surface 110b with the first road surface 110a, the computing system can recognize an invalid point cloud registration or invalid alignment 204 between the first data set 200 and the second data set 202. As discussed above, the computing system can be configured to identify the invalid point cloud registration based on user input, such as via a GUI 130. For example, a user can select a transform of a pose graph to view the alignment 204 between the first data set 200 and the second data set 202. The user can identify the collapse 206 and can select an invalid selectable control to indicate that the alignment 204 is incorrect or invalid based on the incorrect association with the portion of the second road surface 110b with the first road surface 110a. Alternatively, the user can select at least one data point associated with the first data set 200 that represents the collapse 206 (e.g., overpass depicted on second road surface 110b), And can transmit an input that an associated alignment 204 that resulted in the collapse 206 is incorrect. Based in part on the input (e.g., selection of the invalid selectable control, input that the data point is associated with an incorrect location, etc.), the computing system can be configured to identify the invalid point cloud registration (e.g., incorrect alignment).

In some examples, the computing system can be configured to identify the invalid point cloud registration automatically, such as utilizing the techniques described in U.S. patent application Ser. No. 17/549,516, the entire contents of which is incorporated herein by reference above. In at least one example, based on an identification of the invalid point cloud registration, the computing system can associate a repulsive factor (e.g., repulsive force) with the invalid point cloud registration. In some examples, the repulsive factor can be encoded as a modification to a binary factor associated with the invalid point cloud registration. In some examples, the repulsive factor can include a modification to a cost function and/or a loss function associated with the invalid point cloud registration.

In some examples, the computing system can perform an optimization of the alignment 204 between the first data set 200 and the second data set 202 with the repulsive factor. In some examples, the optimization can include a second optimization, performed after a first optimization that resulted in the collapse 206. In at least one example, the repulsive factor can cause a pose associated with at least one of the first data set 200 or the second data set 202 to be associated with a different location. In some examples, the repulsive factor can cause a distance (e.g., lateral, longitudinal, vertical) and/or angular difference (e.g., pitch, roll, yaw) between a first pose associated with the first data set 200 and a second pose associated with the second data set 202 to be modified such that the resulting distance in the second optimization is different from a distance associated with the first optimization. In at least one example, the repulsive force can cause at least one data point associated with the first data set 200 or the second data set 202 to be associated with a different location. For example, the repulsive force can cause a datum of the first data set 200 or the second data set 202 that is associated with the collapse 206 to be associated with a different location than that depicted in FIG. 2.

Figure 3:
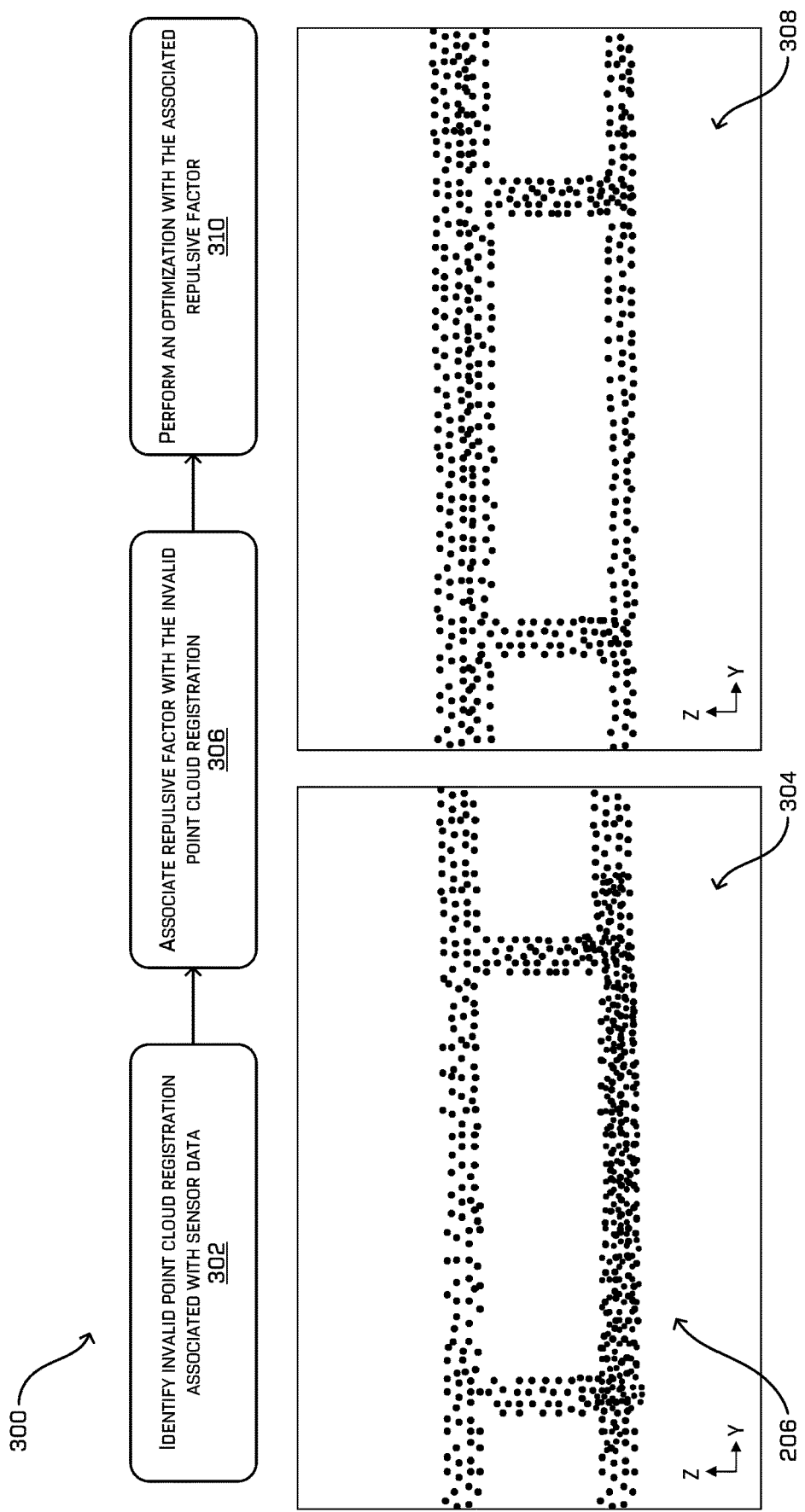
FIG. 3 illustrates an example process for modifying a factor associated with an invalid point cloud registration, in accordance with examples of the disclosure.

FIG. 3 depicts an example process 300 for modifying a factor associated with an invalid point cloud registration, in accordance with examples of the disclosure. In at least one example, the factor can include a binary factor associated with a point cloud registration that is determined to be invalid, such as by the computing system or based on user input. In some examples, the computing system can encode the binary factor with a repulsive force, such as to repel a measured location and/or measured distance associated with the invalid point cloud registration.

At operation 302, the computing system identifies an invalid point cloud registration. In various examples, the computing system can identify the invalid point cloud registration based on results of a first optimization 304. That is, the computing system can perform the first optimization 304 on an alignment or transform between a first data set (e.g., first data set 200) and a second data set (e.g., second data set 202) to identify the invalid point cloud registration. In some examples, the computing system can identify the invalid point cloud registration independent of an optimization (e.g., the first optimization 304). For example, the computing system can determine an invalid point cloud registration based on an inconsistency between semantic classification labels associated with point cloud data projected into a voxel space, as described herein. For another example, the computing system can identify the invalid point cloud registration based on an inconsistency between occupied and/or free space in voxels of a voxel space into which point cloud data is projected.

As discussed above, the invalid point cloud registration can represent an invalid measurement associated with at least one of the first data set or the second data set. The invalid measurement can include an incorrect distance and/or angular difference between a first pose associated with the first data set and a second pose associated with the second data set. The incorrect distance can include at least one of an incorrect lateral, longitudinal, or vertical distance between the first pose and the second pose and the incorrect angular difference can include at least one of an incorrect pitch, roll, and yaw between the first pose and the second pose. In some examples, the invalid measurement can include an incorrect location associated with at least one data point associated with the first data set or the second data set.

As discussed above, the computing system can identify the invalid point cloud registration based on user input and/or based on characteristics associated with a voxel space into which the first data set and the second data set are projected. In at least one example, the computing system can identify the invalid point cloud registration utilizing techniques such as those described in U.S. patent application Ser. No. 17/549,516, the entire contents of which is incorporated herein by reference above.

At operation 306, the computing system associates a repulsive factor with the invalid point cloud registration. In at least one example, the repulsive factor can be encoded into a binary factor associated with the invalid point cloud registration. In such an example, the repulsive factor (e.g., modified binary factor, modified factor) may repel at least one of the first pose or the second pose from the measured location and/or from the measured distance associated with the invalid point cloud registration. That is, the repulsive factor can cause at least one of a pose associated with the invalid point cloud registration or a data point of an associated data set to be repelled from a measured location associated with the originally determined point cloud registration, such as that described with respect to operation 302.

In various examples, the repulsive factor can include a modification to a cost function associated with the invalid point cloud registration. In some examples, the cost function can be modified to apply a high penalty or cost associated with the measured location and/or measured distance in a second optimization. In such examples, the modification to the cost function can result in at least one of a pose or a distance between poses associated with a second optimization 308 to be different from that resulting from the first optimization 304. For example, assuming d is the distance between a node and a measured (or incorrect position), the error is represented as $e=1/d^p$, where p modulates how sharp or blunt the repulsion is. Other examples of error calculations include $e=\exp(-d^p)$, $e=1/(1+d^p)$, $e=1/(1+d^p)^{(1/p)}$, and/or the like.

In some examples, the repulsive factor can include a modification to a loss function associated with the invalid point cloud registration. The loss function can include a function that decreases a weight of an observed error associated with an outlier (e.g., an invalid point cloud registration), to reduce an overall impact of the observed error in an optimization. In various examples, the modification to the loss function can include modifying the weight applied to the observed error and/or otherwise modifying how the observed error is treated, such as to bias a solution away from a position associated with an invalid point cloud registration.

At operation 310, the computing system performs an optimization 308, which may, in some examples, be a second optimization. In at least one example, the optimization 308 can be performed with the repulsive factor associated with the invalid point cloud registration. As discussed above, based on the repulsive factor, at least one of a pose or a distance between poses associated with the optimization 308 can be different from that resulting from the optimization 304. As illustrated in FIG. 3, the repulsive factor can cause at least one data point associated with the first data set or the second data set to be associated with a different location. For example, the repulsive factor can cause a datum (e.g., data point) associated with the collapse 206 (e.g., first road section 110*a*) to be represented at a location closer to or in association with the overpass (e.g., different location than those associated with a datum or data point marked as "invalid").

Though illustrated as a single repulsive factor associated with a single invalid point cloud registration causing the collapse 206 to be associated with a location closer to a true representation, this is not intended to be so limiting, and the repulsive factor can cause the collapse 206 to be associated with a location is different from the location associated with the optimization 304. In some examples, for the collapse 206 to be represented similarly to the environment, the computing system can apply two or more repulsive factors to two or more invalid point cloud registrations. Further, in some examples, the computing system can be configured to iteratively perform optimizations with modified factors associated with various invalid point cloud representations until determining that a number of invalid point cloud registrations associated with an optimization is at or below a threshold value (e.g., less than 1, less than 3, etc.).

In at least one example, the computing system can be configured to determine a validity of map data associated with the second optimization 308. In some examples, the validity can be determined based on a determination that the number of invalid point cloud registrations associated with the second optimization 308 being below the threshold number. In some examples, the computing system can determine the validity based on user input. For example, the user can input an indication that the map data (or results) associated with the second optimization 308 are valid.

In some examples, based on the determination of validity of the map data, the computing system can update a map associated with the environment. In at least one example, the computing system can transmit the updated map to one or more vehicles, such as to be used for navigation and/or localization in the environment.

Figure 4:
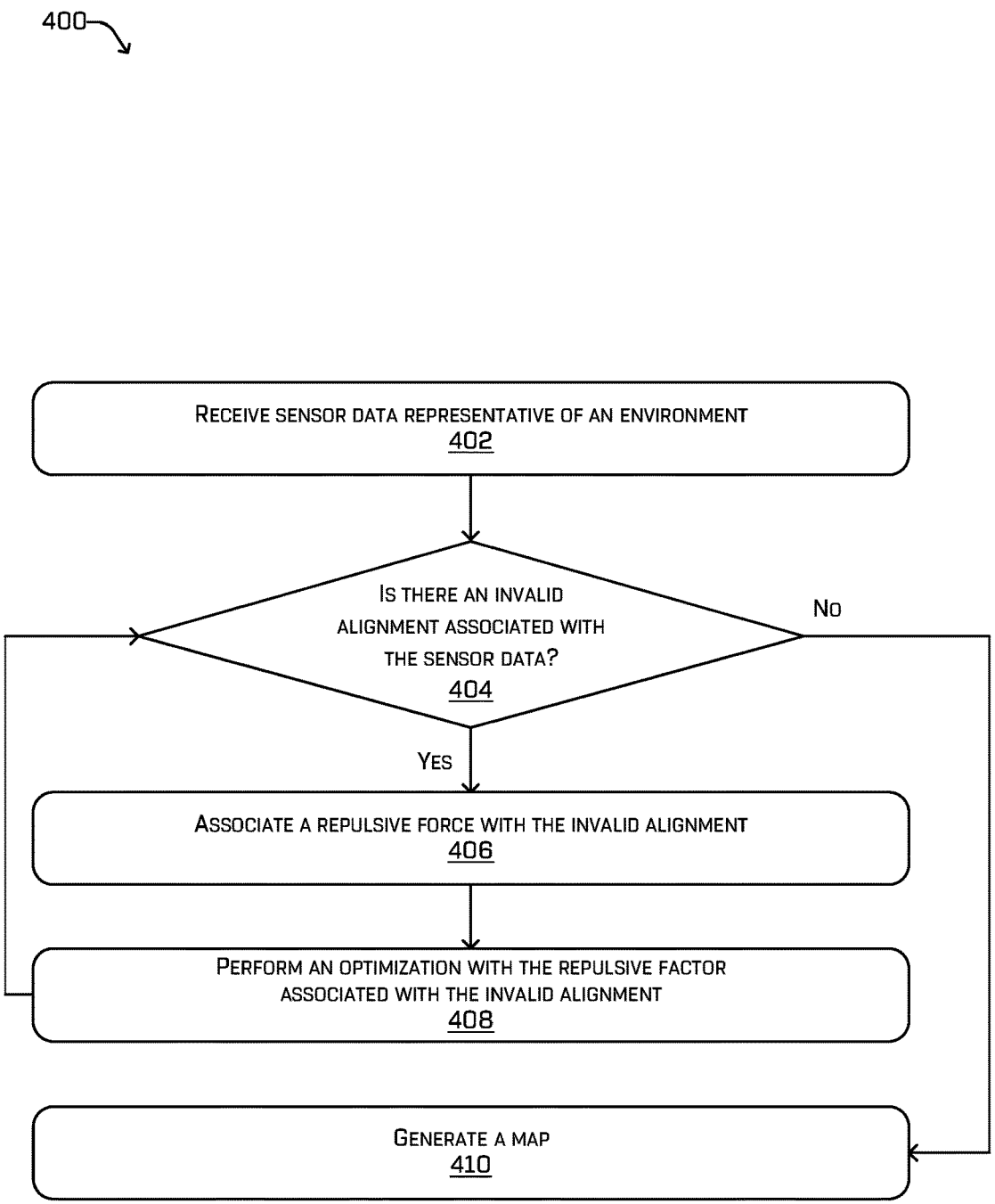
FIG. 4 illustrates an example process for generating a map of an environment, in accordance with examples of the disclosure.

FIG. 4 depicts an example process in accordance with examples of the disclosure. This process is illustrated as a logical flow graph, each operation of which representing a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted and/or combined in any order and/or in parallel to implement the processes.

FIG. 4 depicts an example process 400 for generating a map of an environment. Some or all of the process 400 can be performed by one or more components in FIG. 1 and/or FIG. 5, as described herein. For example, some or all of the process 400 can be performed by the vehicle computing device(s) 118 and/or computing device(s) 104 of FIG. 1. For another example, some or all of the process 400 can be performed by the vehicle computing device(s) 504 and/or computing device(s) 532 of FIG. 5.

At operation 402, the process 400 includes receiving sensor data representative of an environment in which a vehicle is operating. In at least one example, the sensor data can include lidar data representative of the environment. In some examples, the sensor data can include images, such as those captured by one or more cameras, inertial data, such as that captured by one or more inertial measurement units, wheel sensors, and/or the like. That is, though described herein primarily as being associated with lidar data captured by lidar sensors in an environment, this is not intended to be so limiting, and the techniques described herein can be applied to additional or alternative modalities. In some examples, the sensor data can include raw sensor data, such as that captured by one or more sensors of the vehicle. In some examples, the sensor data can include processed sensor data, such as data including semantic classification labels, and/or the like. For example, the sensor data can include lidar data comprising per-point semantic classification labels.

As discussed above, the computing system can be configured to project discrete sets of data (e.g., lidar point clouds) into a voxel space. In some examples, the computing system can identify a transform between two discrete sets of lidar data. The transform can include a 6 DoF transformation between the two data sets. In some examples, the transform can be associated with a first optimization of the discrete sets of data. In at least one example, the transform can represent an alignment between a first pose associated with a first data set and a second pose associated with a second data set.

At operation 404, the process 400 includes determining whether there is an invalid alignment (e.g., incorrect alignment) associated with the sensor data. In some examples, the invalid alignment can be associated with results of applying a first optimization algorithm. As discussed above, the computing system can determine the invalid alignment based on user input and/or based on voxel characteristics associated with a voxel space into which the sensor data (e.g., lidar point clouds) are projected. In various examples, the user input can include a selection of an alignment (e.g., edge) associated with a pose graph resulting from a pose graph optimization, and an indication that the alignment is invalid. In some examples, the user input can include a section of a data point associated with a point cloud, and an indication that the data point is associated with an invalid location. In such examples, the user input is received in association with a visual representation of the projected lidar point clouds aligned based on a transformation.

In various examples, the computing system can identify the invalid alignment based on characteristic(s) of voxels in the voxel space that include at least a portion of a first data set (e.g., first point cloud) and/or a second data set (e.g., second point cloud). In some examples, the characteristic(s) can include semantic classification labels associated with data points of the first data set and the second data set. In such examples, based on a determination that the semantic classification labels associated with data points of the first data set and the second data set in a particular voxel differ by a threshold amount, the computing system can identify the invalid alignment. That is, a check on semantic classification labels associated with data points that are at least partially aligned can be utilized to determine whether a given alignment (e.g., point cloud registration) is invalid. For example, in response to projecting the first data set and the second data set into the voxel space, the computing system can compare semantic classification labels associated with data points of the first data set and the second data set that reside in a single voxel. In response to a determination that of the threshold difference between the semantic classification labels associated with first data set and the second data set that reside in the single voxel meets or exceeds a threshold difference, the computing system determines that the alignment between the first data set and the second data set is invalid.

In some examples, the characteristic(s) can include occupied space and/or free space associated with voxels in the voxel space into which the first data set and the second data set are projected. In some examples, the computing system can compare voxels that are at least partially aligned to determine whether a same or similar number of data points associated with the first data set and the second data set reside within a voxel of the voxel space. In some examples, the computing system can compare voxels to determine whether a voxel is occupied by one or more data points of the first data set but not the second data set. That is, the computing system can determine invalidity based on a determination that a first voxel is occupied by data points of the first data set but constitutes free space with regard to the second data set. In some examples, the free space can be determined based on a threshold number of data points of a data set being associated with a voxel. In some examples, the free space can be determined utilizing ray casting techniques. In response to a determination that a voxel is occupied by a first data set (e.g., threshold number of data points associated with the voxel) but not the second data set, the computing system determines that the point cloud registration between the first data set and the second data set is invalid.

These and other techniques for automatically identifying an invalid alignment, or an invalid point cloud registration (e.g., without human input) are described in U.S. patent application Ser. No. 17/549,516, the entire contents of which is incorporated herein by reference above.

Based on a determination that the invalid alignment is associated with the first optimization ("Yes" at operation 404), the process 400, at operation 406, associates a repulsive factor with the invalid alignment. In at least one example, the computing system encodes the invalid alignment with the repulsive force. In some examples, the repulsive force can include a modification to a binary factor associated with the invalid alignment. That is, the repulsive force can include a modification to a factor associated with the invalid alignment, such as to bias a solution away from a measured location and/or position.

In some examples, the modification to the binary factor can cause a distance and/or angular difference between a first pose associated with the first data set and a second pose associated with a second data set to be modified in an optimization (e.g., a second optimization). In some examples, the repulsive force can include a modification to a cost function associated with the invalid alignment. In such examples, the cost function can be modified to generate large errors in the second optimization in response to a first pose of the first data set (e.g., first node in a pose graph) and a second pose of the second data set (e.g., second node in the pose graph) being a measured distance from one another. In some examples, the repulsive force can include a modification to a loss function associated with the invalid alignment. In at least one example, the repulsive force can cause one or more data points associated with at least one of the first data set or the second data set to be associated with different location(s) in the second optimization other than the measured locations associated with the invalid alignment in response to the first optimization.

At operation 408, the process 400 includes performing an optimization with the repulsive force (e.g., modified factor, modified cost function, modified loss function, etc.) associated with the invalid alignment. The second optimization can include applying a pose graph algorithm or optimization algorithm to the invalid alignment including the repulsive force.

In at least one example, the process 400 returns to operation 404 to determine whether another invalid alignment is associated with the optimization performed at operation 408. That is, the process 400 can include an iterative process to continually determine whether an invalid alignment is associated with an optimization of sensor data. In some examples, the computing system can iteratively apply repulsive forces and perform optimizations until identifying that a number of invalid point cloud registrations associated with an optimization is less than a threshold number (e.g., less than 1, less than 2, etc.). In some examples, the computing system can be configured to validate map data based on the number of invalid point cloud registrations being less than the threshold.

Based on a determination that no invalid alignment is associated with the sensor data based on the optimization ("No" at operation 404), the process 400, at operation 410, 400 includes generating map data based on the second optimization. In some examples, the computing system may request human intervention, such as via a user interface, to validate the map data. In some examples, the generated map can include a new map of the environment associated with the sensor data. In some examples, the generated map can include an update to an existing map of the environment associated with the sensor data. That is, the computing system can be configured to update an existing map based on recent data captured in association with the environment. As such, the computing system can ensure that the maps utilized by vehicles are accurate and up-to-date, such as to ensure safe operation of one or more vehicles in the environment. In at least one example, in response to generating the map, the computing system can transmit the map (e.g., new map, updated map, etc.) to one or more vehicles configured to operate in the environment.

Figure 5:
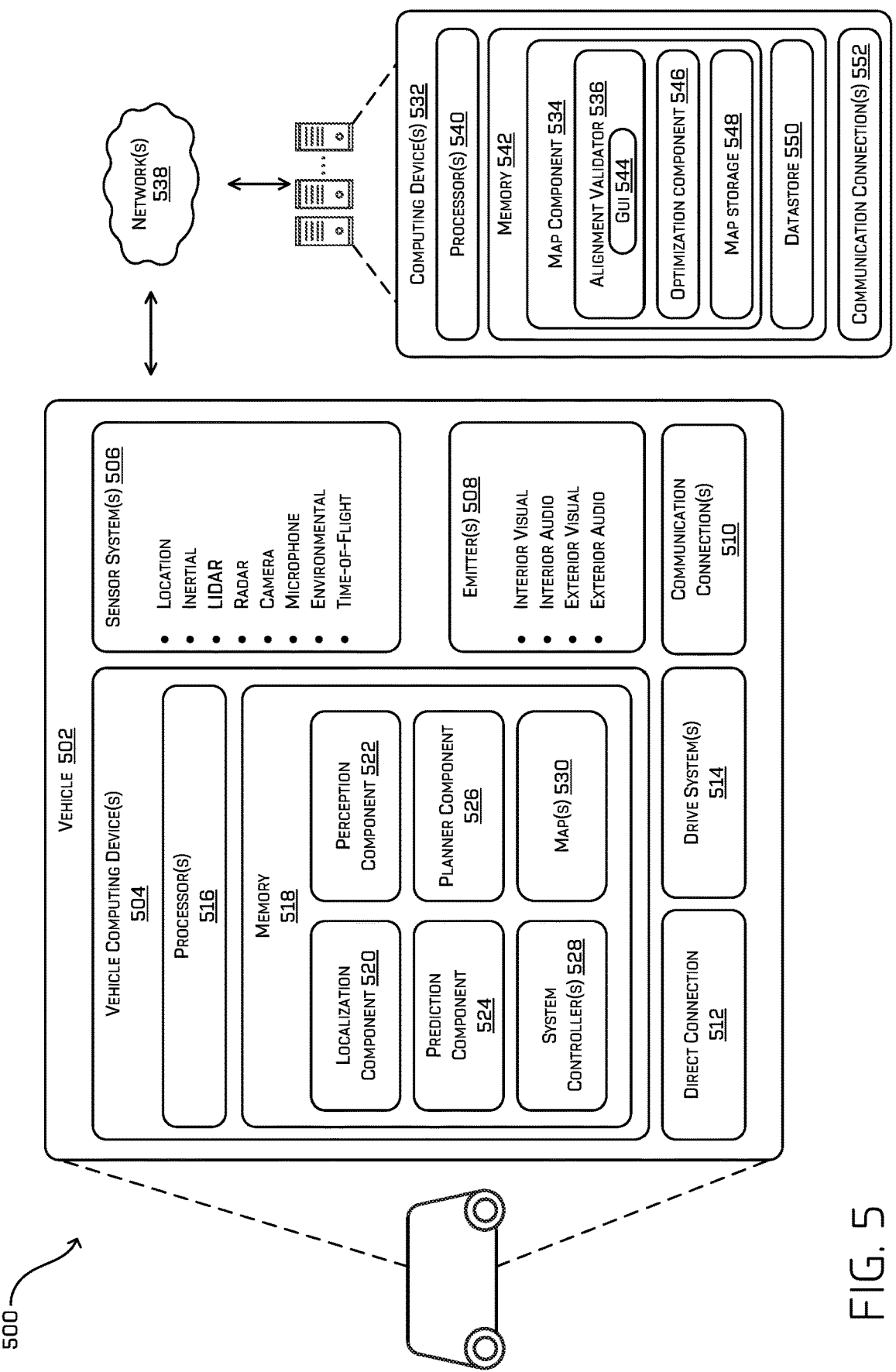
FIG. 5 is a block diagram of an example system for implementing the techniques described herein.

FIG. 5 is a block diagram illustrating an example system 500 for performing techniques, as described herein. In at least one example, a vehicle 502, which can correspond to the vehicle 102 described above with reference to FIG. 1, can include one or more vehicle computing devices 504 (e.g., device(s) 118), one or more sensor systems 506 (e.g., sensor system(s) 116), one or more emitters 508, one or more communication connections 510 (e.g., communication connection 120), at least one direct connection 512, and one or more drive systems 514. As described above, the vehicle 502 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 502 can be configured to control all functions from start to stop, including all described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 502 is an autonomous vehicle; however, the vehicle 502 could be any other type of vehicle. While only a single vehicle 502 is illustrated in FIG. 5, in a practical application, the example system 500 can include a plurality of vehicles, which, in some examples, can comprise a fleet of vehicles.

The vehicle computing device(s) 504 can include processor(s) 516 and memory 518 communicatively coupled with the processor(s) 516. In the illustrated example, the memory 518 of the vehicle computing device(s) 504 stores a localization component 520, a perception component 522 (which can correspond to the perception component 122 described above with reference to FIG. 1), a prediction component 524, a planner component 526, one or more system controllers 528, and one or more maps 530. Additionally, the memory 518 can include a storage (e.g., datastore), which can store captured sensor data, machine learned model(s), previous outputs, etc. In at least one example, a map 530 can be any number of data structures that are capable of providing information about an environment, such as, but not limited to, topologies (such as junctions, lanes, merging zones, etc.), streets, mountain ranges, roads, terrain, and the environment in general. Map(s) 530 can be associated with real environments or simulated environments. In at least one example, map(s) 530 can be generated by a computing device 532 utilizing the techniques described herein and in U.S. patent application Ser. No. 17/549,516, the entire contents of which is incorporated herein by reference above.

In at least one example, the localization component 520 can determine a pose (position and orientation) of the vehicle 502 in relation to a local and/or global map based at least in part on sensor data received from the sensor system(s) 506 and/or map data associated with a map (e.g., of the map(s) 530). In at least one example, the localization component 520 can include, or be associated with a calibration system that is capable of performing operations for calibrating (determining various intrinsic and extrinsic parameters associated with any one or more of the sensor system(s) 506), localizing, and mapping substantially simultaneously.

In at least one example, the perception component 522 can perform object detection, segmentation, and/or classification based at least in part on sensor data received from the sensor system(s) 506. In at least one example, the perception component 522 can receive raw sensor data (e.g., from the sensor system(s) 506). In at least one example, the perception component 522 can receive image data and can utilize one or more image processing algorithms to perform object detection, segmentation, and/or classification with respect to object(s) identified in the image data. In some examples, the perception component 522 can associate a bounding box (or otherwise an instance segmentation) with an identified object and can associate a confidence score associated with a classification of the identified object with the identified object. In some examples, objects, when rendered via a display, can be colored based on their perceived class. The perception component 522 can perform similar processes for one or more other modalities.

In at least one example, the perception component 522 can be configured to associate a semantic classification label with one or more lidar data points associated with a lidar point cloud. As discussed herein, the semantic classification labels can be used to identify invalid alignments between lidar point clouds. That is, the perception component 522 can provide the semantic classification labels to a map component 534 of the computing device 532, such as to an alignment validator 536 of the map component 534, and the map component 534 can use the semantic classification labels to determine whether an alignment of associated point clouds is invalid.

The prediction component 524 can receive sensor data from the sensor system(s) 506, map data associated with a map 530, and/or perception data output from the perception component 522 (e.g., processed sensor data), and can output predictions associated with one or more objects within the environment of the vehicle 502. In at least one example, the planner component 526 can determine outputs, to use to control the vehicle 502 based at least in part on sensor data received from the sensor system(s) 506, map data, and/or any determinations made by the other components of the vehicle 502.

Additional details of localization component 520 (e.g., localization system), perception component 522 (e.g., perception system), prediction component 524 (e.g., prediction system), and/or planner component 526 (e.g., planning system) that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples (e.g., where the vehicle 502 is not an autonomous vehicle), one or more of the aforementioned systems can be omitted from the vehicle 502. While the systems described above are illustrated as "onboard" the vehicle 502, in other implementations, the systems can be remotely located and/or accessible to the vehicle 502.

As discussed above, the memory 518 can include one or more maps 530 that can be used by the vehicle 502 to navigate within the environment, such as those included in the map data described above. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some examples, the vehicle 502 can be controlled based at least in part on the map(s) 530. That is, the map(s) 530 can be used in connection with the localization component 520, the perception component 522, the prediction component 524, and/or the planner component 526 to determine a location of the vehicle 502, determine whether a maneuver of the vehicle 502 satisfies one or more conditions associated with navigating within an environment.

In some examples, the one or more maps 530 can be stored on a remote computing device(s) (such as the computing device(s) 532) accessible via one or more networks 538. In some examples, multiple maps 530 can be stored based on, for example, a characteristic (e.g., type of entity, time of day, day of week, season of the year, etc.). Storing multiple maps 530 can have similar memory requirements but increase the speed at which data in a map can be accessed.

As can be understood, the components discussed herein (e.g., the localization component 520, the perception component 522, the prediction component 524, the planner component 526, the one or more system controllers 528, the one or more maps 530 are described as divided for illustrative purposes. However, the operations performed by the various components may be combined or performed in any other component.

In some instances, aspects of some or all of the components discussed herein can include any models, techniques, and/or machine learning techniques. For example, in some instances, the components in the memory 518 (and the memory 542, discussed below) can be implemented as a neural network.

As described herein, an exemplary neural network is a biologically inspired technique which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naive Bayes, Gaussian naive Bayes, multinomial naive Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the localization component 520, the perception component 522, the prediction component 524, and/or the planner component 526 can process sensor data, as described above, and can send their respective outputs over network(s) 538, to the computing device(s) 532. In at least one example, the localization component 520, the perception component 522, the prediction component 524, and/or the planner component 526 can send their respective outputs to the computing device(s) 532 at a particular frequency, after a lapse of a predetermined period of time, in near real-time, etc.

In at least one example, the vehicle computing device(s) 504 can include one or more system controllers 528, which can be configured to control steering, propulsion, braking, safety, emitters, communication, and other systems of the vehicle 502. These system controller(s) 528 can communicate with and/or control corresponding systems of the drive system(s) 514 and/or other systems of the vehicle 502.

In at least one example, the sensor system(s) 506 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), time-of-flight (ToF) sensors, etc. The sensor system(s) 506 can provide input to the vehicle computing device(s) 504. In some examples, the sensor system(s) 506 can preprocess at least some of the sensor data prior to sending the sensor data to the vehicle computing device(s) 504. In at least one example, the sensor system(s) 506 can send sensor data, via the network(s) 538, to the computing device(s) 532 at a particular frequency, after a lapse of a predetermined period of time, in near real-time, etc.

The vehicle 502 can also include one or more emitters 508 for emitting light and/or sound, as described above. The emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 508 can be positioned at various locations about the exterior and/or interior of the vehicle 502.

The vehicle 502 can also include communication connection(s) 510 that enable communication between the vehicle 502 and other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 can also enable the vehicle 502 to communicate with a remote teleoperations computing device or other remote services.

The communications connection(s) 510 can include physical and/or logical interfaces for connecting the vehicle computing device(s) 504 to another computing device or a network, such as network(s) 538. For example, the communications connection(s) 510 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 512 can directly connect the drive system(s) 514 and other systems of the vehicle 502.

In at least one example, the vehicle 502 can include drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include sensor system(s) to detect conditions of the drive system(s) 514 and/or the surroundings of the vehicle 502. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, etc. Some sensors, such as the wheel encoder(s), can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle 502, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive system(s) 514. Furthermore, the drive system(s) 514 can also include communication connection(s) that enable communication by the respective drive module with other local or remote computing device(s).

In FIG. 5, the vehicle computing device(s) 504, sensor system(s) 506, emitter(s) 508, and the communication connection(s) 510 are shown onboard the vehicle 502. However, in some examples, the vehicle computing device(s) 504, sensor system(s) 506, emitter(s) 508, and the communication connection(s) 510 can be implemented outside of an actual vehicle (i.e., not onboard the vehicle 502).

As described above, the vehicle 502 can send sensor data to the computing device(s) 532, via the network(s) 538. In some examples, the vehicle 502 can send raw sensor data to the computing device(s) 532. In other examples, the vehicle 502 can send processed sensor data and/or representations of sensor data to the computing device(s) 532 (e.g., data output from the localization component 520, the perception component 522, the prediction component 524, and/or the planner component 526). In some examples, the vehicle 502 can send sensor data to the computing device(s) 532 at a particular frequency, after a lapse of a predetermined period of time, in near real-time, etc.

The computing device(s) 532 can receive the sensor data (raw or processed) from the vehicle 502 and/or other data collection devices, as well as data from one or more third party sources and/or systems. In at least one example, the computing device(s) 532 can include processor(s) 540 and memory 542 communicatively coupled with the processor(s) 540. In the illustrated example, the memory 542 of the computing device(s) 532 stores the map component 534 including the alignment validator 536, a GUI 544 (e.g., GUI 130), and an optimization component 546 (e.g., optimization component 126), and map storage 548 (e.g., storing one or more maps), and datastore 550 configured to store additional or alternative data, such as training data, one or more data models, historical data (e.g., old maps, previous poses, etc.). In some examples, one or more of the systems and/or storage repositories can be associated with the vehicle 502 or other computing device(s) associated with the system 500 instead of, or in addition to, being associated with the memory 542 of the computing device(s) 532.

As discussed above, the optimization component 546 can be configured to identify an alignment between two discrete sets of data and perform a first optimization on the alignment. In some examples, the alignment validator 536 can be configured to determine whether the alignment determined by the optimization component 546 is valid (e.g., correct). Based on a determination that the alignment is valid, the optimization component 546 can generate a map based on the data and store the map, such as in map storage 548. Based on a determination that the alignment is invalid, as discussed herein, the optimization component 546 can associate a flag with the alignment, the flag providing an indication of invalidity. In some examples, based on an identification of the flag with an alignment, the optimization component 546 can associate a repulsive force (repulsive factor) with the alignment and perform a second optimization. In some examples, the optimization component 546 can generate the map based on the results of the second optimization, such as output of the second optimization.

In at least one example, the map component 534 can be configured to provide the map (e.g., an updated map of the environment) to the vehicle computing device(s) 504, such as to be used in navigation and/or localization. In some examples, the map component 534 can provide the map via a communication connection 552, which can be the same or different from the communication connection(s) 510. The communications connection(s) 552 can include physical and/or logical interfaces for connecting the computing device(s) 532 to another computing device (e.g., vehicle computing device(s) 504) over a network, such as network(s) 538. For example, the communications connection(s) 552 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The processor(s) 516 of the vehicle 502 and the processor(s) 540 of the computing device(s) 532 can be any suitable processor capable of executing instructions to process data and perform operations as described herein. By way of example and not limitation, the processor(s) 516 and 540 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 542 are examples of non-transitory computer-readable media. Memory 518 and 542 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in some examples, systems of the vehicle 502 can be associated with the computing device(s) 532 and/or the systems of the computing device(s) 532 can be associated with the vehicle 502. That is, the vehicle 502 can perform one or more of the functions associated with the computing device(s) 532, and vice versa. For example, as described herein, the map component 534 of the computing device 532 can be configured to identify an invalid point cloud registration and associate a repulsive force therewith, such as to improve a map generating process. That is, the map generation process is described as an offline process. However, in some example, the vehicle computing device(s) 504 can include a map component, such as map component 534, that is configured to identify invalid point cloud registrations in an optimization, apply repulsive forces, and perform additional optimizations in order to generate an updated map utilizing the techniques described herein. That is, though described as an offline process, this is not intended to be so limiting and the techniques described herein can additionally or alternatively be performed on vehicle 502, such as when the vehicle 502 is operating (e.g., online mode).

Example Clauses

A: A method comprising: receiving sensor data representative of an environment, the sensor data comprising a first data set and a second data set; determining, based at least in part on a performing a first optimization using the first data set and the second data set, a first alignment between the first data set and the second data set, the first alignment comprising a position of the second data set relative to the first data set; determining that the first alignment is invalid; in response to determining that the first alignment is invalid, associating the first alignment with a repulsive factor, wherein the repulsive factor causes an alignment optimization to bias a solution away from the position; determining, based at least in part on performing a second optimization using the first data set, second data set, and repulsive factor, a second alignment between the first data set and the second data set; determining, based at least in part on the second alignment, map data associated with the environment; and transmitting the map data to a vehicle configured to traverse the environment based at least in part on the map data.

B: The method of paragraph A, further comprising receiving, via a user interface, an indication of invalidity associated with the first alignment, wherein determining that the first alignment is invalid is based at least in part on the indication of invalidity.

C: The method of either paragraph A or paragraph B, wherein determining that the first alignment is invalid is based at least in part on at least one of: semantic classification labels associated with the first data set and the second data; or an inconsistency between occupied space and free space of a voxel space into which the first data set and the second data set are projected.

D: The method of any one of paragraphs A-C, further comprising iteratively associating one or more repulsive factors with one or more invalid alignments until determining that alignments between data sets associated with the sensor data are correct, wherein the map data is determined in response to determining that the alignments between the data sets associated with the sensor data are correct.

E: The method of any one of paragraphs A-D, wherein the repulsive factor comprises a modification to at least one of a cost function or a loss function associated with the second optimization.

F: One or more non-transitory computer-readable media storing instructions executable by one or more processors of a system, wherein the instructions, when executed, cause the system to perform operations comprising: receiving sensor data representative of an environment; determining, based at least in part on the sensor data, an invalid alignment between a first data set and a second data set of the sensor data; associating the invalid alignment with a repulsive factor; performing an optimization with the repulsive factor associated with the invalid alignment; and generating, based at least in part on the optimization, map data to be used by a vehicle operating in the environment.

G: The one or more non-transitory computer-readable media of paragraph F, wherein the invalid alignment between the first data set and the second data set is associated with a second optimization associated with the sensor data.

H: The one or more non-transitory computer-readable media of either paragraph F or paragraph G, wherein determining the invalid alignment between the first data set and the second data set comprises: receiving, via a user interface, an indication of invalidity associated with an alignment between the first data set and the second data set; and based at least in part on the indication of invalidity, determining that the alignment between the first data set and the second data set is invalid.

I: The one or more non-transitory computer-readable media of any one of paragraphs F-H, the operations further comprising: determining a similarity metric between the first data set and the second data set, the similarity metric being based at least in part on a semantic classification associated with the first data set and the second data set, wherein determining the invalid alignment between the first data set and the second data set is based at least in part on a determination that the similarity metric meets or exceeds a threshold.

J: The one or more non-transitory computer-readable media of any one of paragraphs F-I, the operations further comprising: projecting the first data set and the second data set into a voxel space; and determining an inconsistency between occupied space and free space associated with the first data set and the second data set projected into the voxel space, wherein the invalid alignment is identified based at least in part on the inconsistency between the occupied space and the free space.

K: The one or more non-transitory computer-readable media of any one of paragraphs F-J, wherein the repulsive factor causes at least one of a lateral distance, a longitudinal distance, a vertical distance, a pitch angular difference, a roll angular difference, or a yaw angular difference between a first pose associated with the first data set and a second pose associated with the second data set to be modified.

L: The one or more non-transitory computer-readable media of any one of paragraphs F K, wherein the repulsive factor comprises a modification to at least one of a cost function or a loss function associated with the invalid alignment to bias a solution of an alignment optimization away from one or more of a position of the second data set relative to the first data set or a rotation of the second data set relative to the first data set.

M: The one or more non-transitory computer-readable media of any one of paragraphs F L, the operations further comprising: iteratively associating one or more repulsive factors with one or more invalid alignments until determining that alignments between data sets associated with the sensor data are correct, wherein the map data is generated in response to determining that the alignments between the data sets associated with the sensor data are correct.

N: A system comprising: one or more processors; one or more non-transitory computer-readable media storing instructions that, when executed by the one or more processors, cause the system to perform operations comprising: receiving sensor data representative of an environment; determining, based at least in part on the sensor data, an invalid alignment between a first data set and a second data set of the sensor data; associating the invalid alignment with a repulsive factor; performing an optimization with the repulsive factor associated with the invalid alignment; and generating, based at least in part on the optimization, map data to be used by a vehicle operating in the environment.

O: The system of paragraph N, wherein the invalid alignment between the first data set and the second data set is associated with a second optimization associated with the sensor data.

P: The system of either paragraph N or paragraph O, wherein determining the invalid alignment between the first data set and the second data set comprises: receiving, via a user interface, an indication of invalidity associated with an alignment between the first data set and the second data set; and based at least in part on the indication of invalidity, determining that an alignment between the first data set and the second data set is invalid.

Q: The system of any one of paragraphs N-P, the operations further comprising: determining a similarity metric between the first data set and the second data set, the similarity metric being based at least in part on a semantic classification associated with the first data set and the second data set, wherein determining the invalid alignment between the first data set and the second data set is based at least in part on a determination that the similarity metric meets or exceeds a threshold.

R: The system of any one of paragraphs N-Q, the operations further comprising: projecting the first data set and the second data set into a voxel space; and determining an inconsistency between occupied space and free space associated with the first data set and the second data set projected into the voxel space, wherein the invalid alignment is identified based at least in part on the inconsistency between the occupied space and the free space.

S: The system of any one of paragraphs N-R, wherein the repulsive factor comprises a modification to at least one of a cost function or a loss function associated with the invalid alignment to bias a solution of an alignment optimization away from one or more of a position of the second data set relative to the first data set or a rotation of the second data set relative to the first data set.

T: The system of any one of paragraphs N-S, the operations further comprising: iteratively associating one or more repulsive factors with one or more invalid alignments until determining that alignments between data sets associated with the sensor data are correct, wherein the map data is generated in response to determining that the alignments between the data sets associated with the sensor data are correct.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. One or more non-transitory computer-readable media storing instructions executable by one or more processors of a system, wherein the instructions, when executed, cause the system to perform operations comprising:
   receiving sensor data representative of an environment;
   determining, based at least in part on the sensor data, an invalid alignment between a first data set and a second data set of the sensor data;
   associating the invalid alignment with a repulsive factor, wherein the repulsive factor comprises a modification to at least one of a cost function or a loss function associated with the invalid alignment to bias a solution of an alignment optimization away from one or more of a position of the second data set relative to the first data set or a rotation of the second data set relative to the first data set;
   performing an optimization with the repulsive factor associated with the invalid alignment; and
   generating, based at least in part on the optimization, map data to be used by a vehicle operating in the environment.

2. The one or more non-transitory computer-readable media of claim 1, wherein the invalid alignment between the first data set and the second data set is associated with a second optimization associated with the sensor data.

3. The one or more non-transitory computer-readable media of claim 1, wherein determining the invalid alignment between the first data set and the second data set comprises:
   receiving, via a user interface, an indication of invalidity associated with an alignment between the first data set and the second data set; and
   based at least in part on the indication of invalidity, determining that the alignment between the first data set and the second data set is invalid.

4. The one or more non-transitory computer-readable media of claim 1, the operations further comprising:
   determining a similarity metric between the first data set and the second data set, the similarity metric being based at least in part on a semantic classification associated with the first data set and the second data set,
   wherein determining the invalid alignment between the first data set and the second data set is based at least in part on a determination that the similarity metric meets or exceeds a threshold.

5. The one or more non-transitory computer-readable media of claim 1, the operations further comprising:
   projecting the first data set and the second data set into a voxel space; and
   determining an inconsistency between occupied space and free space associated with the first data set and the second data set projected into the voxel space,
   wherein the invalid alignment is identified based at least in part on the inconsistency between the occupied space and the free space.

6. The one or more non-transitory computer-readable media of claim 1, wherein the repulsive factor causes at least one of a lateral distance, a longitudinal distance, a vertical distance, a pitch angular difference, a roll angular difference, or a yaw angular difference between a first pose associated with the first data set and a second pose associated with the second data set to be modified.

7. The one or more non-transitory computer-readable media of claim 1, the operations further comprising:

iteratively associating one or more repulsive factors with one or more invalid alignments until determining that alignments between data sets associated with the sensor data are correct,
wherein the map data is generated in response to determining that the alignments between the data sets associated with the sensor data are correct.

8. A system comprising:
one or more processors;
one or more non-transitory computer-readable media storing instructions that, when executed by the one or more processors, cause the system to perform operations comprising:
receiving sensor data representative of an environment;
determining, based at least in part on the sensor data, an invalid alignment between a first data set and a second data set of the sensor data;
associating the invalid alignment with a repulsive factor, wherein the repulsive factor comprises a modification to at least one of a cost function or a loss function associated with the invalid alignment to bias a solution of an alignment optimization away from one or more of a position of the second data set relative to the first data set or a rotation of the second data set relative to the first data set;
performing an optimization with the repulsive factor associated with the invalid alignment; and
generating, based at least in part on the optimization, map data to be used by a vehicle operating in the environment.

9. The system of claim 8, wherein the invalid alignment between the first data set and the second data set is associated with a second optimization associated with the sensor data.

10. The system of claim 8, wherein determining the invalid alignment between the first data set and the second data set comprises:
receiving, via a user interface, an indication of invalidity associated with an alignment between the first data set and the second data set; and
based at least in part on the indication of invalidity, determining that an alignment between the first data set and the second data set is invalid.

11. The system of claim 8, the operations further comprising:
determining a similarity metric between the first data set and the second data set, the similarity metric being based at least in part on a semantic classification associated with the first data set and the second data set,
wherein determining the invalid alignment between the first data set and the second data set is based at least in part on a determination that the similarity metric meets or exceeds a threshold.

12. The system of claim 8, the operations further comprising:
projecting the first data set and the second data set into a voxel space; and
determining an inconsistency between occupied space and free space associated with the first data set and the second data set projected into the voxel space,
wherein the invalid alignment is identified based at least in part on the inconsistency between the occupied space and the free space.

13. The system of claim 8, the operations further comprising:
iteratively associating one or more repulsive factors with one or more invalid alignments until determining that alignments between data sets associated with the sensor data are correct,
wherein the map data is generated in response to determining that the alignments between the data sets associated with the sensor data are correct.

14. A method comprising:
receiving sensor data representative of an environment;
determining, based at least in part on the sensor data, an invalid alignment between a first data set and a second data set of the sensor data;
associating the invalid alignment with a repulsive factor, wherein the repulsive factor comprises a modification to at least one of a cost function or a loss function associated with the invalid alignment to bias a solution of an alignment optimization away from one or more of a position of the second data set relative to the first data set or a rotation of the second data set relative to the first data set;
performing an optimization with the repulsive factor associated with the invalid alignment; and
generating, based at least in part on the optimization, map data to be used by a vehicle operating in the environment.

15. The method of claim 14, further comprising:
receiving, via a user interface, an indication of invalidity associated with the invalid alignment,
wherein determining that the invalid alignment is invalid is based at least in part on the indication of invalidity.

16. The method of claim 14, wherein determining the invalid alignment is based at least in part on at least one of:
semantic classification labels associated with the first data set and the second data; or
an inconsistency between occupied space and free space of a voxel space into which the first data set and the second data set are projected.

17. The method of claim 14, further comprising iteratively associating one or more repulsive factors with one or more invalid alignments until determining that alignments between data sets associated with the sensor data are correct,
wherein the map data is determined in response to determining that the alignments between the data sets associated with the sensor data are correct.

18. The method of claim 14, wherein the invalid alignment between the first data set and the second data set is associated with a second optimization associated with the sensor data.

19. The method of claim 14, wherein the invalid alignment is a first alignment and further comprising determining, based at least in part on the optimization with the repulsive factor associated with the invalid alignment, a second alignment.

20. The method of claim 14, further comprising transmitting the map data to a vehicle configured to traverse the environment based at least in part on the map data.

* * * * *